United States Patent [19]
Masur et al.

[11] Patent Number: 5,150,973
[45] Date of Patent: Sep. 29, 1992

[54] MOUNTING SLEEVE FOR ANTI-FRICTION BEARING

[75] Inventors: Ernst Masur, Untereuerheim; Gottfried Ruoff, Oberwerrn; Werner Planek, Dittelbrunn, all of Fed. Rep. of Germany

[73] Assignee: FAG Kugelfischer Georg Schafer KgaA, Fed. Rep. of Germany

[21] Appl. No.: 809,266

[22] Filed: Dec. 16, 1991

[30] Foreign Application Priority Data

Jan. 28, 1991 [DE] Fed. Rep. of Germany ... 9100928[U]

[51] Int. Cl.$^5$ .................. F16C 41/04; F16C 33/60; F16C 43/04
[52] U.S. Cl. .................. 384/448; 384/506; 384/510; 384/537
[58] Field of Search ........ 384/445, 448, 456, 504-506, 384/510, 537, 539, 559-561, 569, 584

[56] References Cited

U.S. PATENT DOCUMENTS

| | | | |
|---|---|---|---|
| 1,367,610 | 2/1921 | Lehmann | 384/504 |
| 4,508,397 | 4/1985 | Hofmann et al. | 384/510 |
| 4,820,060 | 4/1989 | Braune et al. | 384/510 X |
| 4,995,736 | 2/1991 | Haase et al. | 384/448 |

Primary Examiner—Thomas R. Hannon
Attorney, Agent, or Firm—Ostrolenk, Faber, Gerb & Soffen

[57] ABSTRACT

A mounting sleeve particularly for the loose annular parts of a multi-row anti-friction bearing wherein the rows of rolling bodies are toward the axial ends of the outer ring. The mounting sleeve is approximately U-shaped with a slit opening of about 90° in it extending along the sleeve. At axially opposite ends of the U-shaped sleeve are formed radially inwardly directed flanges which extend over a smaller circumferential angle than the sleeve, e.g. over an angle of about 180°, and are each symmetric around the U-shaped sleeve. Projections on the axial insides of the flanges rest axially either against the row of rolling bodies or against the separators for the row of rolling bodies. A radially outward projection opposite the slit opening in the sleeve aids in installation and removal of the sleeve.

16 Claims, 1 Drawing Sheet

MOUNTING SLEEVE FOR ANTI-FRICTION BEARING

BACKGROUND OF THE INVENTION

The present invention relates to a mounting sleeve which is installable radially onto and removable radially off a ring, particularly an outer ring of an anti-friction bearing.

Mounting aids of various types have been known for a long time. For instance, Federal Republic of Germany AS 11 19 786 shows a mounting sleeve in which needle bearing sets comprised of a plurality of parts are arranged into an intermediate structural unit prior to the final mounting. This provides a unit which is later eliminated by axially moving the sleeve away shortly before the installation of the needle bearing sets into the machine. This also prevents parts from falling out in an unmounted condition. Such a sleeve, however, can only be used in connection with parts which are easily mounted, like rounded needles customarily are. Furthermore, insertion of a shaft into the needle bearing sets does not form a structural unit since undesired axial movements can be carried out by the needle rings due to bearing play.

SUMMARY OF THE INVENTION

It is an object of the present invention to provide a mounting sleeve for a bearing which does not have the above indicated disadvantages and in which simple radial removal of the mounting sleeve is possible.

A mounting sleeve of the invention may be applied on any ring and to hold in any place a plurality of any axially loose parts, and particularly the loose annular parts of a multi-row anti-friction bearing. The loose parts of the bearing include the annular row(s) of rolling bodies and the respective separators or cages for the rows. The sleeve is particularly useful where the rows of rolling bodies of the bearing are toward the axial ends of the outer ring.

To enable radial direction installation and later removal of the mounting sleeve on the outer ring, the sleeve is of approximately U-shaped cross section and particularly surrounds the outer ring or rings of the bearing. To provide a connection of the sleeve on the outer ring which is sufficient but detachable, the gap opening between the arms of the U-shaped part extends about 90° around the ring, and the gap extends over the length of the sleeve. The sleeve grips around the outer ring in a form locked manner.

At axially opposite ends of the U-shaped mounting sleeve are formed radially inwardly directed, partially annular flanges, which extend over a smaller circumferential angle than the sleeve, e.g. over an angle of about 180°. Each flange is symmetrically positioned around the U-shaped sleeve. In order to facilitate the snapping of the mounting sleeve over the outer surface of the outer ring, the radial flanges extend only over an annular region of 180°. In this way, stiffening of the sections of the sleeve which engage behind the outer ring is substantially reduced. Axial fixing of the inner ring parts is obtained with the radially directed annular flanges arranged on the two end surfaces of the U-shaped part.

Knob shaped projections on the axial inside of the flanges rest axially either against the rolling bodies or indirectly against the rolling bodies by resting against the separators for the row of rolling bodies. A radially outward projection on the sleeve opposite the slit in the sleeve aids in installation and removal of the sleeve from the outer ring.

The sleeve embodiment described above, for instance, is adaptable for mounting on a double row angular ball bearing in which the outer ring is a single part but there are two axially adjacent inner rings and in which there are no shoulders or lips toward the end surfaces of the outer ring, which enables assembly of the other bearing elements on the single part outer ring. Without an installed mounting sleeve in this case, the two inner rings and the two sets of rolling bodies would likely drop out from such a bearing. However, if the mounting sleeve is snapped over the outer ring, the resulting structure can be handled with little difficulty during the mounting phase. Before final installation of the bearing in a machine, a shaft is customarily pushed into the bore of the inner rings. Since there is at least a slight force fit between the inner rings and the shaft, the mounting sleeve can then be removed radially without the bearing falling apart. If the known inner sleeve, which is arranged in the bores of the inner ring parts, were instead provided, then a sufficiently close connection would not be present, at least for a short time upon the pushing out of the inner sleeve by the shaft due to the shoulders or lips in the bores which are necessary for other reasons. The inner rings would then shift radially with respect to each other, which would make the insertion of a shaft impossible, or the bearing would then fall apart.

Anti-friction bearings in an unmounted state frequently have play between their individual parts. Since this can lead to damage to the parts upon transportation of the bearing, it is advisable to eliminate the play. Play is eliminated here by the knobs or protrusions which are arranged on the axially inner side of both flanges and which rest with slight pressure against the cages or separators at the rows of rolling bodies. Elimination of the axial play also reduces the radial play to zero in the case of most anti-friction bearings.

To facilitate the installation and removal of the sleeve, its outer surface has an axially directed radially outward projection. Sleeve mounting aid tools can be placed on the projection.

Other objects, features and advantages of the present invention will become apparent from the following description of a preferred embodiment of the invention which refers to the accompanying drawings.

DETAILED DESCRIPTION OF THE PREFERRED EMBODIMENT

Figure 1:
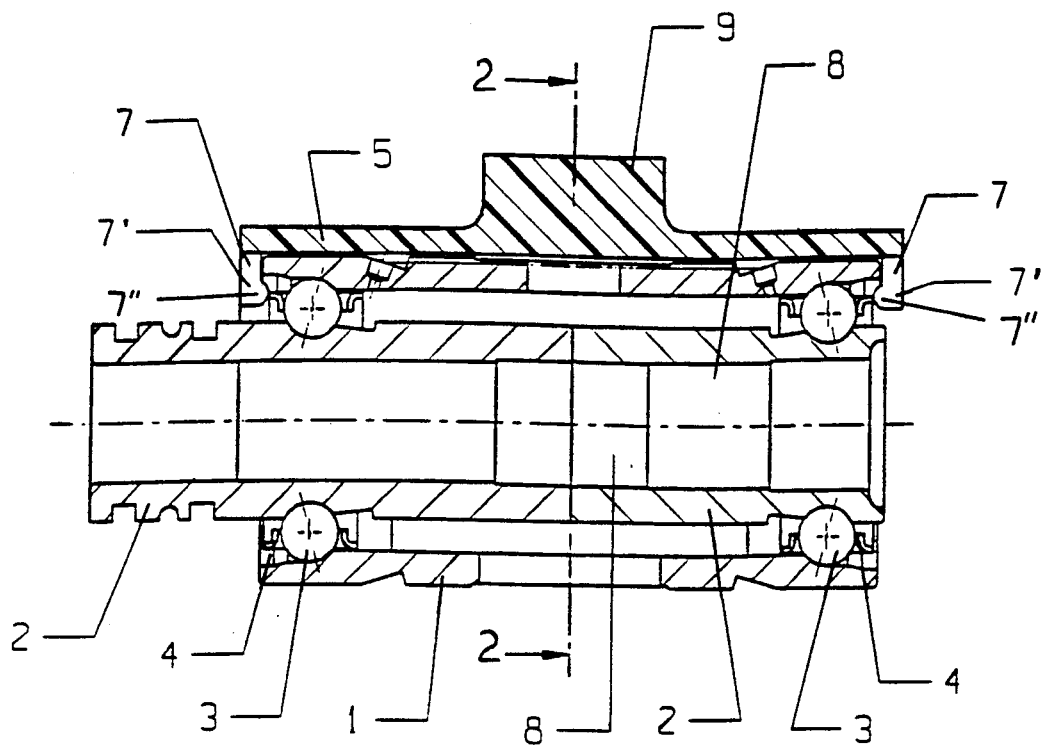
FIG. 1 is a longitudinal section through a mounting sleeve on a double-row angular ball bearing.

Referring to FIG. 1, the illustrated bearing is a double row angular contact ball bearing having an outer ring 1 which is developed as a single part and having two identical axially aligned and adjacent inner rings 2 which are sized and shaped to be symmetric about the middle of the bearing. The two annular rows of rolling bodies 3, e.g. balls, together with the respective separators 4 for the rows of rolling bodies, are arranged between the races of the outer and inner rings.

Figure 2:
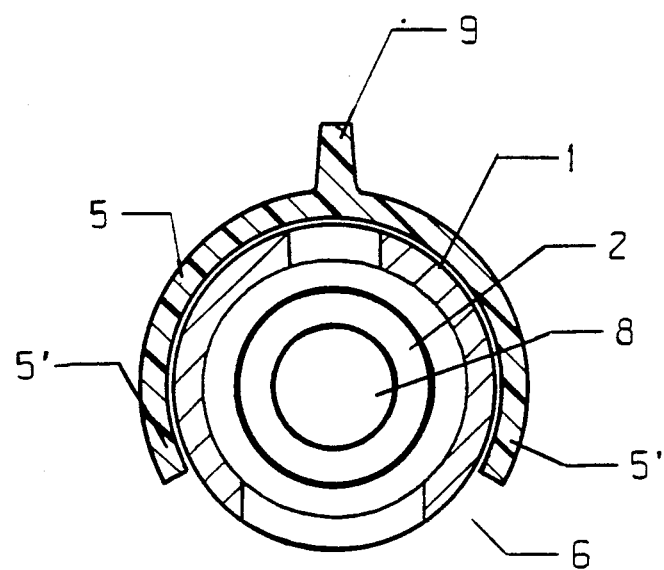
FIG. 2 is a cross section through the embodiment of FIG. 1.

As shown in FIG. 2, the bearing is surrounded by an approximately U-shaped mounting sleeve 5, which has a slit opening 6 of about 90° between the arms of the U and extending along the full length of the sleeve. The gap width is coordinated with the selection of material for the sleeve 5 to permit, on the one hand, elastic outward movement of the arms 5' of the sleeve upon radial application of the sleeve onto or radial removal of the sleeve from the outer ring 1 and, on the other hand, to cause a form locked gripping of the outer ring.

On its axially outward sides, the outer ring 1 does not have any lips or shoulders which the balls 3 could come against. Therefore, the inner rings 2 together with the balls 3 between the outer and inner rings could drop out of the outer ring 1. In order to avoid this, both end surfaces of the mounting sleeve 5 have radially inwardly directed, partially annular flanges 7, which extend radially inward approximately up to the separators 4 at each row of rolling bodies. Since the inner rings 2 have lips on both axial sides in the axial regions of the two rows of balls 3, these lips and the inner rings form a structural unit with the other parts of the bearing. The flanges 7 extend only over a smaller circumferential region of 180° and each is symmetrically located around the sleeve 5. The sleeve extends over a greater circumferential region of 270°. The flanges do not extend into the circumferential end regions or arms 5' of the sleeve 5. Although the end of the flange 7 is sufficient for axially holding the bearing parts, it does not eliminate the required high elasticity of the arms 5'. That elasticity is, furthermore, favored by the flanges 7 being provided with a few longitudinal slits 7' making those flanges into fingers.

On their axially inner sides and radially inward on the flanges 7, there are knob-shaped projections 7'', which lie with slight pressure against the adjacent separators 4. This avoids the play which is present in many bearings in the unmounted condition and avoids damage to bearing parts upon vibrations during the transportation of the bearing.

After the application of the bearing onto a shaft (not shown), which is inserted into the common bore 8 of both inner rings 2, the mounting sleeve 5 can be removed from the outer ring 1. It is removed in the radial direction, and the elastic arms 5' are pulled off the outer ring 1. To facilitate this removal a radial projection 9 is provided on the outer surface of the sleeve 5. Mounting or removal aid tools, for instance, pliers, can be applied to the projection.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A mounting sleeve for an anti-friction bearing, the bearing having an outer ring, an inner ring and at least one annular row of anti-friction rolling bodies between the rings;

the mounting sleeve being of approximately U-shaped cross-section with a slit opening extending along the axial length of the sleeve and the slit opening defining arms of and circumferential ends of the sleeve, the width of the opening between the ends of the arm being sufficient to enable the sleeve to be installed, slit opening first, over the outer ring and to enable the sleeve to be removed from the outer ring with the outer ring passing through the slit opening;

the row of rolling bodies being toward one axial end of the inner and the outer rings;

a flange extending at least partially around the sleeve, located at the one axial end of the sleeve and extending radially inward to at least indirectly engage the row of rolling bodies to help prevent the rolling bodies in the row from moving axially out from the outer ring.

2. The mounting sleeve of claim 1, wherein there is a respective one of the flanges at each axial end of the sleeve.

3. The mounting sleeve of claim 1, wherein the bearing comprises two axially spaced apart annular rows of rolling bodies supported between the outer ring and the inner ring;

a respective one of the flanges at each axial end of the sleeve, each flange at least indirectly engaging a respective one of the rows of rolling bodies to prevent the row of rolling bodies from moving out from the outer rings.

4. The mounting sleeve of claim 3, wherein the mounting sleeve is shaped so that the slit opening is about 90° wide around the sleeve.

5. The mounting sleeve of claim 4, wherein the flanges are partially annular extending over a region of about 180° around the sleeve and the flanges are arranged symmetrically circumferentially around the sleeve.

6. The mounting sleeve of claim 3, wherein the flanges are partially annular, are symmetric circumferentially around the sleeve and extend over a circumferential length around the sleeve which is shorter than the circumferential length of the sleeve around the outer ring.

7. The mounting sleeve of claim 6, further comprising the flanges having longitudinal slits therein at intervals around the flanges.

8. The mounting sleeve of claim 6, further comprising a projection radially out of the mounting sleeve and away from the slit opening for being grasped for aiding in placement of the sleeve on and removal of the sleeve from the outer ring.

9. The mounting sleeve of claim 3, further comprising the flanges having longitudinal slits therein at intervals around the flanges.

10. The mounting sleeve of claim 3, further comprising axially inwardly directed projections on the axially inner sides of the flanges and positioned to at least indirectly rest against the rolling bodies.

11. The mounting sleeve of claim 10, further comprising a respective separator at each row of the rolling bodies, the rolling bodies rows being axially so placed along the bearing outer ring and the separators being so placed with respect to the respective rows of rolling bodies that the projections rest axially against the separators.

12. The mounting sleeve of claim 3, further comprising a respective separator at each row of the rolling bodies, the rolling bodies rows being axially so placed along the bearing outer ring and the separators being so placed with respect to the respective rows of rolling bodies that the flanges rest axially against the separators.

13. The mounting sleeve of claim 3, further comprising a projection radially out of the mounting sleeve and away from the slit opening for being grasped for aiding in placement of the sleeve on and removal of the sleeve from the outer ring.

14. A mounting sleeve for a plurality of axially loose annular parts, wherein the parts include an outer ring to be engaged by the mounting sleeve;

the mounting sleeve being of approximately U-shapes cross-section with a slit opening extending along the axial length of the sleeve and the slit opening defining arms of and circumferential ends of the sleeve, and the width of the opening between the ends of the arm being sufficient to enable the sleeve to be installed, slit opening first, over the outer ring and to be removed from the outer ring with the outer ring passing through the slit;

a flange extending at least partially around the annular sleeve, located at one axial end of the sleeve and extending radially inwardly to at least indirectly engage the loose annular parts to help prevent the loose parts from moving axially out past the flange.

15. The mounting sleeve of claim 14, further comprising a respective one of the flanges at each axial end of the sleeve, and each flange at least indirectly engaging the loose annular parts from the respective end of the sleeve.

16. The mounting sleeve of claim 15, wherein the flanges are partially annular, are symmetric circumferentially around the sleeve and extend over a circumferential length around the sleeve which is shorter than the circumferential length of the sleeve around the outer ring.

* * * * *